United States Patent
Kaneko et al.

(10) Patent No.: US 9,233,551 B2
(45) Date of Patent: Jan. 12, 2016

(54) APPARATUS, SYSTEM, AND METHOD OF INSPECTING IMAGE, AND RECORDING MEDIUM STORING IMAGE INSPECTION CONTROL PROGRAM

(75) Inventors: Hitomi Kaneko, Saitama (JP); Tadashi Kitai, Kanagawa (JP); Hiroyoshi Ishizaki, Kanagawa (JP); Keiji Kojima, Kanagawa (JP); Keiichi Miyamoto, Kanagawa (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 462 days.

(21) Appl. No.: 13/584,050

(22) Filed: Aug. 13, 2012

(65) Prior Publication Data

US 2013/0044342 A1   Feb. 21, 2013

(30) Foreign Application Priority Data

Aug. 16, 2011 (JP) ................... 2011-178081
Jul. 23, 2012 (JP) ................... 2012-162802

(51) Int. Cl.
*G06K 15/12* (2006.01)
*B41J 2/21* (2006.01)
*B41J 29/393* (2006.01)
*G06K 15/02* (2006.01)

(52) U.S. Cl.
CPC .............. *B41J 2/2135* (2013.01); *B41J 29/393* (2013.01); *G06K 15/1868* (2013.01)

(58) Field of Classification Search
CPC ... B41J 2/2135; B41J 29/393; G06K 15/1868
USPC ......... 358/504, 1.13–1.18, 446, 1.9; 382/291, 382/293, 294, 295
See application file for complete search history.

(56) References Cited

U.S. PATENT DOCUMENTS

| | | | |
|---|---|---|---|
| 2002/0149798 A1 * | 10/2002 | Liu | 358/406 |
| 2004/0252317 A1 * | 12/2004 | Murakami | 358/1.9 |
| 2007/0177228 A1 * | 8/2007 | Crockett et al. | 358/504 |
| 2010/0188714 A1 | 7/2010 | Yamakawa | |
| 2010/0328688 A1 * | 12/2010 | Sakamoto et al. | 358/1.9 |

FOREIGN PATENT DOCUMENTS

| | | | |
|---|---|---|---|
| JP | 2005-223515 | 8/2005 | |
| JP | 2005223515 A * | 8/2005 | ............... H04N 1/00 |
| JP | 2010-151606 | 7/2010 | |
| JP | 2010-165011 | 7/2010 | |

* cited by examiner

*Primary Examiner* — Marivelisse Santiago-Cordero
*Assistant Examiner* — Kent Yip
(74) *Attorney, Agent, or Firm* — Harness, Dickey & Pierce

(57) ABSTRACT

An inspection apparatus obtains a correction parameter for correcting the positional shift between a previously read image and a master image, and corrects one of a currently read image or a master image using the correction parameter for the previously read image, before comparing between the currently read image and the master image to detect the positional shift in the currently read image.

13 Claims, 10 Drawing Sheets

FIG. 7A

SINGLE-SIDED PRINT

| NUMBER OF PAGES | X-DIRECTION SHIFT (pixel) | Y-DIRECTION SHIFT (pixel) |
|---|---|---|
| 1 | 10 | 7 |
| 1000 | 12 | 8 |
| 10000 | 14 | 10 |
| 19999 | 15 | 11 |
| 20000 | 16 | 11 |
| 100000 | 16 | 11 |

FIG. 7B

DOUBLE-SIDED PRINT

| NUMBER OF PAGES | X-DIRECTION SHIFT (pixel) | Y-DIRECTION SHIFT (pixel) |
|---|---|---|
| 1 | 12 | 10 |
| 1000 | 14 | 11 |
| 10000 | 16 | 13 |
| 19999 | 17 | 14 |
| 20000 | 18 | 14 |
| 100000 | 19 | 14 |

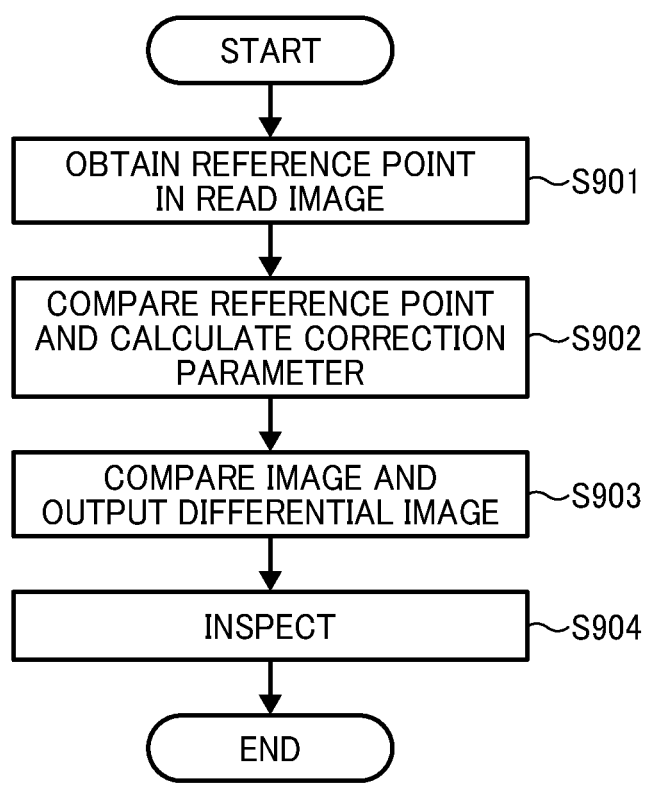

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application Nos. 2011-178081, filed on Aug. 16, 2011, and 2012-162802, filed on Jul. 23, 2012, in the Japan Patent Office, the entire disclosure of which is hereby incorporated herein by reference.

BACKGROUND

1. Field

The present invention relates to an apparatus, system, and method of inspecting an image formed by an image forming apparatus, and a recording medium storing an image inspection control program.

2. Background

The recent image forming system may be provided with an inspection apparatus, which reads a printed image output from an image forming apparatus, generates a master image from image data of the printed image, and compares the read image with the master image to determine whether the printer image sufficiently reproduces the image data. To compare between the read image and the master image, each pixel in the read image needs to be compared with a corresponding pixel in the master image. In view of this, the pixel position of the master image may be corrected so as to match the pixel position of the read image, which may shrink in size or may be skewed during print processing, by enlarging or reducing the size of the master image or rotating the master image. For example, the inspection apparatus may specify a plurality of reference points in the read image, which correspond to a plurality of reference points in the master image, by pattern matching. Based on the positional shifts of the reference points between the read image and the master image, a correction parameter to be used for correcting the master image may be set. This technique of correcting the positional shift in the read image based on pattern matching is, however, time consuming and requires high computation loads.

Japanese Patent Application Publication No. 2005-223515 discloses an inspection apparatus, which previously calculates a correction parameter for correcting the positional shift of the read image attributable to the stationary noise. The calculated correction parameter is used to correct the read image before correcting the read image based on pattern matching as described above, thus reducing the processing time.

This technique described in Japanese Patent Application Publication No. 2005-223515 has drawbacks such that the calculated correction parameter is not able to correct the positional shift due to the non-stationary noise, such as the noise attributable to the temporal change in print processing. For example, it is assumed that the degree of shrinking or skewing of the printed image tends to change, depending on the operation conditions of the image forming apparatus such as an accumulated operation time of the image forming apparatus. If the positional shift of the read image becomes greater as the operation time of the image forming apparatus increases, the processing time and the computation loads that are required for inspecting the printed image increase as well.

SUMMARY

In view of the above, one aspect of the present invention is to provide an apparatus, system, method, and an inspection control program stored in a recording medium, each of which is capable of inspecting a printed image formed by an image forming apparatus, while taking into account the positional shift of the printed image that may be attributable to the non-stationary noise, such as the positional shift attributable to the change in print processing that may be observed over time.

For example, the inspection apparatus obtains a correction parameter for correcting the positional shift between a previously read image and a master image. The inspection apparatus corrects one of a currently read image or a master image using the correction parameter for the previously read image, before comparing between the currently read image and the master image to detect the position shift in the currently read image. Accordingly, the pixel positions of the currently read image and the pixel positions of the master image substantially match, such that the positional shift attributable to the non-stationary noise is efficiently removed before the inspection apparatus inspects the currently read image that reflects the currently printed image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7A is an example illustration for explaining the relationship between a number of printed sheets and the degree of a positional shift in a printed image, when single-sided printing is performed;

FIG. 7B is an example illustration for explaining the relationship between a number of printed sheets and the degree of a positional shift in a printed image, when double-sided printing is performed;

FIG. 8 is a flowchart illustrating operation of correcting the pixel positions of a master image, performed by the inspection apparatus of FIG. 1, according to an example embodiment of the present invention;

FIG. 9 is a flowchart illustrating operation of inspecting a printed image using the corrected master image, performed by the inspection apparatus of FIG. 1, according to an example embodiment of the present invention;

Figure 1:
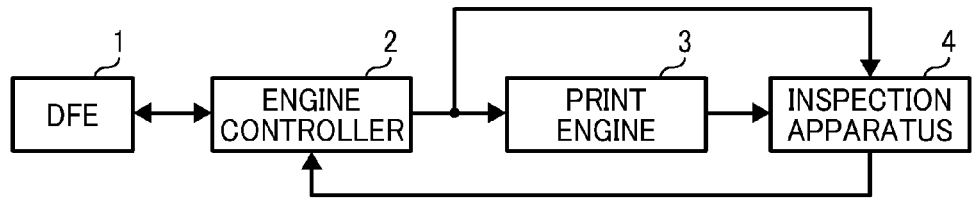
FIG. 1 is a schematic block diagram illustrating an image forming system including an inspection apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples, an image forming system is provided, which includes a digital front end (DFE) that generates a binary image of image data to be printed, a print engine that forms a printed image based on the binary image under control of an engine controller, and an inspection apparatus that inspects the printed image formed by the print engine 3 using a master image that is generated by converting the binary image into a multivalue image.

FIG. 1 illustrates a configuration of an image forming system according to an example embodiment of the present invention. The image forming system of FIG. 1 includes a digital front end (DFE) 1, an engine controller 2, a print engine 3, and an inspection apparatus 4. The image forming system of FIG. 1 may be used for production printing in which a large number of images are sequentially printed and output. The images to be printed may be the same or different, depending on the image data.

The DFE 1 receives a print job, which includes image data to be printed, from an information processing apparatus such as a personal computer through a network. The DFE 1 applies halftone processing to image data to be printed to generate a binary image in which each image pixel is expressed in chromatic or achromatic color (such as black or white), and outputs the binary image to the engine controller 2.

The engine controller 2 receives the binary image from the DFE 1, and controls the print engine 3 to form an image based on the binary image. The engine controller 2 further inputs the binary image to the inspection apparatus 4.

The print engine 3 forms an image on a recording sheet based on the binary image under control of the engine controller 2, and outputs the formed image as a printed image. The print engine 3 further reads the printed image using a reading device to generate read image data ("read image"), and inputs the read image to the inspection apparatus 4.

The inspection apparatus 4 converts the binary image input from the engine controller 2 into a multivalue image to generate a master image, which is used for inspecting the printed image of the print engine 3. The inspection apparatus 4 compares the read image input from the print engine 3 with the master image to correct the pixel positions of the read image or the master image before inspecting the printed image of the print engine 3. More specifically, the inspection apparatus 4 obtains a correction parameter for correcting the positional shift in a previously read image with respect to a master image. Using the correction parameter for the previously read image, the inspection apparatus 4 corrects the positional shift in the read image with respect to the master image or the positional shift in the master image with respect to the read image, such that the read image and the master image substantially match in size and pixel position. The inspection apparatus 4 further inspects the read image that reflects the printed image, based on difference between the read image and the master image in pixel value.

In the following examples, since the read image is scanned image data of the printed image that is output from the print processor 301, the read image and the printed image may be used interchangeably.

Figure 2:
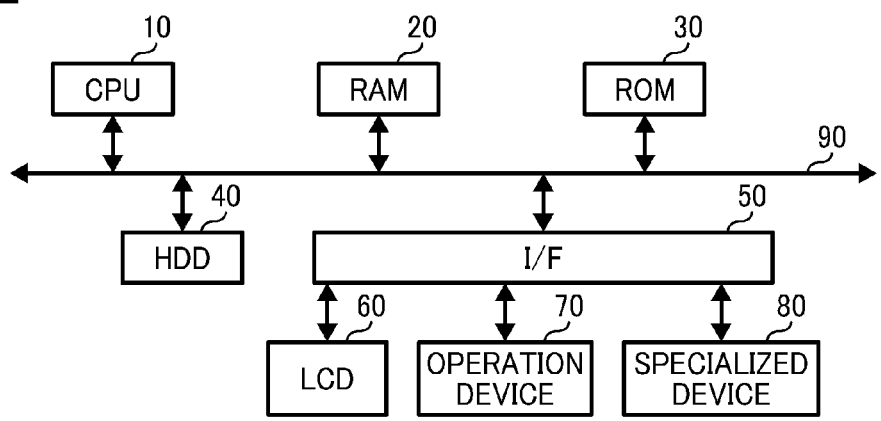
FIG. 2 is a schematic block diagram illustrating a hardware structure of a control section of any one of an engine controller, a print engine, and the inspection apparatus of FIG. 1, according to an example embodiment of the present invention.

Referring now to FIG. 2, a hardware structure of the inspection apparatus 4 is explained according to an example embodiment of the present invention.

As illustrated in FIG. 2, the inspection apparatus 4 is implemented by an information processing apparatus such as a personal computer or a server computer. The inspection apparatus 4 includes a central processing unit (CPU) 10, a random access memory (RAM) 20, a read only memory (ROM) 30, a hard disk drive (HDD) 40, and an interface (I/F) 50, which are connected through a bus 90. The inspection apparatus 4 further includes a liquid crystal display (LCD) 60, an operation device 70, and a specialized device 80, which are connected to the I/F 50.

The CPU 10 is implemented by a processor such as a microprocessor, which is capable of controlling entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS), and application programs such as the inspection control program.

The I/F 50 allows various hardware devices to be connected through the bus 90 or to the outside through a network, and controls these connections. The LCD 60 functions as a user interface, which allows a user to visually check status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 is a hardware device that causes the information processing apparatus of FIG. 2 to additionally have specialized functions to cause the information processing apparatus to function as the inspection apparatus 4. More specifically, with the specialized device 80, the CPU 10 converts the binary image into the multivalue image to generate the master image, or compares the master image with the read image of the printed image. The specialized device 80 may be implemented by, for example, Application Specific Integrated Circuit (ASIC).

The specialized functions of the inspection apparatus 4 may be alternatively implemented by software, such as the inspection control program that is stored in a memory such as the ROM 30, HDD 40, or any desired recording medium such as an optical disc. When executed by the CPU 10, the inspection control program may be read onto the RAM 20 to cause the CPU 10 to control various hardware devices of FIG. 2 according to the control program.

Alternatively, the specialized functions of the inspection apparatus 4 may be realized by a combination of software and hardware such as a combination of the inspection control program and the ASIC of the specialized device 80.

The control section of the print engine 3 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the print engine 3. More specifically, the specialized device 80 of the print engine 3 includes a plotter that forms a printed image on a recording sheet, and a reading device that reads the printed image into read image data. The example mechanical structure of the print engine 3 is explained below referring to FIG. 4.

The control section of the engine controller 2 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the engine controller 2. For example, the specialized device 80 causes the engine controller 2 to control forming of a printed image and inspecting of the printed image.

Figure 3:
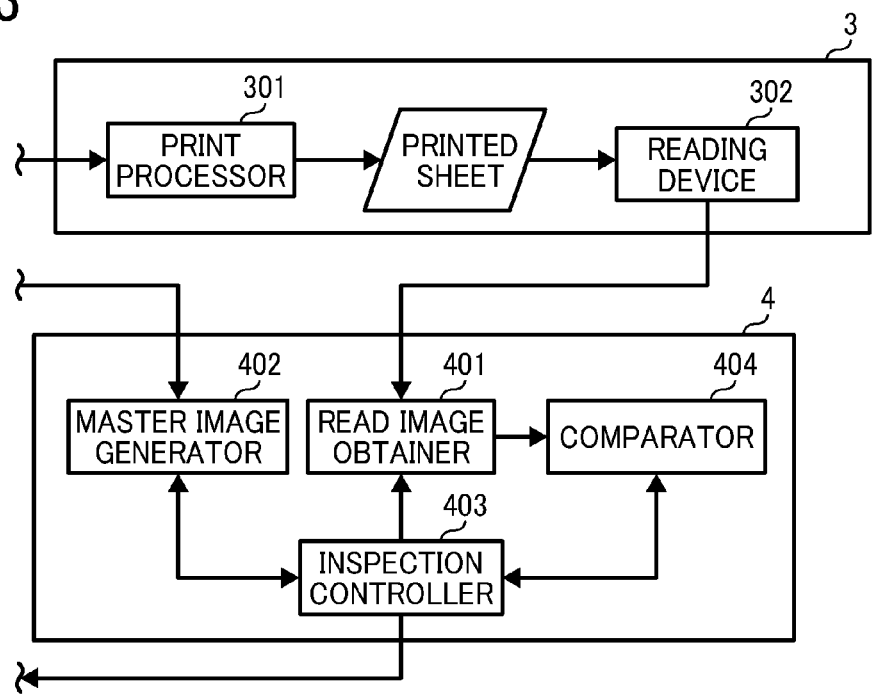
FIG. 3 is a schematic block diagram illustrating a functional structure of the print engine and the inspection apparatus of FIG. 1, according to an example embodiment of the present invention.

FIG. 3 illustrates a schematic block diagram illustrating functional structures of the print engine 3 and the inspection apparatus 4, according to an example embodiment of the present invention. As illustrated in FIG. 3, the print engine 3 includes a print processor 301 and a reading device 302. The inspection apparatus 4 includes a read image obtainer 401, a master image generator 402, an inspection controller 403, and a comparator 404.

Figure 4:
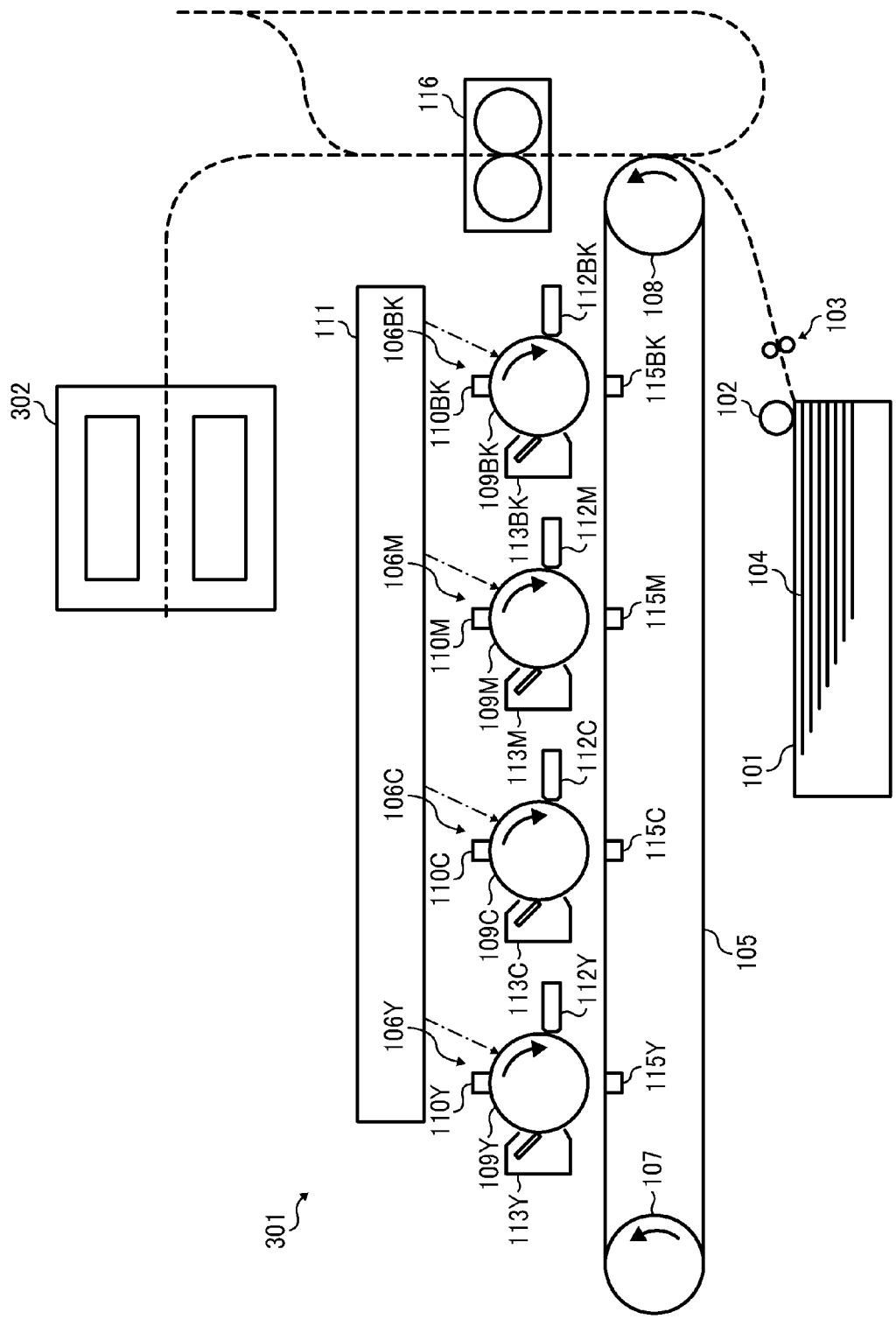
FIG. 4 is a schematic block diagram illustrating a mechanical structure of the print engine of FIG. 1, according to an example embodiment of the present invention.

The print processor 301 obtains the binary image from the engine controller 2, and forms an image of the binary image on a recording sheet to output a printed image. In this example, the print processor 301 is implemented by an image forming device that forms an image using the electrophotographic method, such as a tandem-type image forming device as illustrated in FIG. 4. Alternatively, the print processor 301 may be implemented by any other desired image forming device such as an inkjet printer.

The reading device 302 reads the printed image formed on the recording sheet, which is output from the print processor 301, into read image data, and outputs the read image to the inspection apparatus 4. The reading device 302 is implemented by a line scanner, which is provided in the print engine 3 such that the reading device 302 can scan the printed image formed on the recording sheet as the recording sheet is transferred and output from the print engine 3. For example, the reading device 302 may be disposed along a transfer passage through which the recording sheet is transferred. As the recording sheet is being transferred, the reading device 302 reads the printed image formed on the recording sheet by scanning the surface of the recording sheet. In this example, the reading device 302 outputs the read image in which each image pixel is expressed by eight bits of RGB colors (total of 24 bits), with resolution of 200 dpi.

Referring now to FIG. 4, mechanical structures of the print processor 301 and the reading device 302 are explained according to an example embodiment of the present invention. As illustrated in FIG. 4, the print processor 301 is implemented by a tandem-type image forming device 106, which includes a plurality of image forming devices 106BK, 106M, 106C, and 106Y that are arranged side by side along a transfer belt 105 in a sheet transfer direction. The transfer belt 105, which is an endless belt, functions as an intermediate transfer body onto which an image is transferred from the image forming device 106.

More specifically, the print processor 301 further includes a paper tray 101, a feed roller 102, a separation roller pair 103, a drive roller 107, a driven roller 108, an optical writing device 111, a plurality of transfer devices 115BK, 115M, 115C, and 115Y, and a fixing device 116. In example operation, the feed roller 2 picks up a recording sheet, from a stack of recording sheets which are stored in the paper tray 101. The separation roller pair 103 transfers the recording sheet toward the image forming device 106 such that one sheet is transferred at a time.

The image forming devices 106BK, 106M, 106C, and 106Y each have substantially the same structure except for the color of toner being used to form an image. The image forming devices 106BK, 106M, 106C, and 106Y respectively form a black image, magenta image, cyan image, and yellow image.

The transfer belt 105 is stretched over the drive roller 107 and the driven roller 108, which are respectively rotated in the direction indicated by the arrow. The drive roller 107, which is rotated by a drive motor, and the driven roller 108 that is driven with rotation of the drive roller 107 together drive the transfer belt 105. The optical writing device 111 irradiates lights of respective colors toward the surfaces of a photoconductive drum 109BK, 109M, 109C, and 109Y to form latent images of respective colors thereon.

The image forming device 106BK includes the photoconductive drum 109BK functioning as a photoconductor. Along the circumferential direction of the photoconductive drum 109BK, a charger 110BK, a developer 112BK, a cleaner 113BK, and a discharger are provided. The charger 110BK uniformly charges the surface of the photoconductive drum 109BK. The optical writing device 111 scans lights irradiated from a light source based on the black color image toward the surface of the photoconductive drum 109BK to form a latent image thereon. The developer 112BK develops the latent image into a toner image using black toner to form a black toner image on the photoconductive drum 109BK.

The black toner image is transferred with rotation of the photoconductive drum 109BK to an image transfer nip formed between the photoconductive drum 109BK and the transfer device 115BK via the transfer belt 105, and transferred from the surface of the photoconductive drum 109BK to the surface of the transfer belt 105 at the image transfer nip. As the black toner image is transferred, the black toner image is formed on the surface of the transfer belt 105. After image transfer, the cleaner 113BK removes residual toner from the surface of the photoconductive drum 109BK, for example, with a brush roller. The discharger further discharges the surface of the photoconductive drum 109BK to prepare for subsequent image forming operation.

The black toner image formed on the surface of the transfer belt 105 is transferred toward the image forming device 106M with rotation of the transfer belt 105. The image forming device 106M forms a magenta toner image on the surface of the photoconductive drum 109M, and further transfers the magenta toner image so as to be superimposed on the black toner image carried by the transfer belt 105.

In a substantially similar manner, the cyan toner image formed on the photoconductive drum 109C and the yellow toner image formed on the photoconductive drum 109Y are transferred so as to be superimposed on the black and yellow toner images, thus forming a full-color toner image on the transfer belt 105.

The recording sheet, which is fed from the paper tray 104, is transferred to the driven roller 108. At a position where the driven roller 108 is disposed, the full-color image formed on the transfer belt 105 is transferred onto the recording sheet to form the full-color image on the recording sheet. The recording sheet 104 having the image formed thereon is further transferred to the fixing device 116. The fixing device 116 fixes the image onto the recording sheet by heat and pressure. The recording sheet with the image is discharged from the print processor 301, toward the reading device 302.

In case images are formed on both sides of the recording sheet 104, the recording sheet with the fixed image is transferred to a switch back passage. After the surface of the recording sheet is reversed, the recording sheet is further transferred back to the position where the driven roller 108 is disposed to form an image thereon. The recording sheet having the images formed on both sides of the sheet is then discharged from the print processor 301, toward the recording device 302. The recording device 302 reads the image formed on the recording sheet 104 into read image data, which is subjected for inspection.

Referring back to FIG. 3, the read image obtainer 401 of the inspection apparatus 4 obtains the read image output from the print engine 3, and inputs the read image to the comparator 404 as an image for inspection. The master image generator 402 obtains the binary image input by the engine controller 2, and generates a master image to be compared with the read image subjected for inspection by the inspection apparatus 4.

The inspection controller 403 functions as a controller that controls entire operation of the inspection apparatus 4, for example, by controlling each unit or device of the inspection apparatus 4. The comparator 404 compares the read image input by the read image obtainer 401 with the master image generated by the master image generator 402 to determine whether the image formed by the print engine 3 is in good quality as expected. The comparator 404 may be implemented by the ASIC of the specialized device 80 such that the comparator 404 is able to compute a large amount of data with high speeds.

Figure 5:
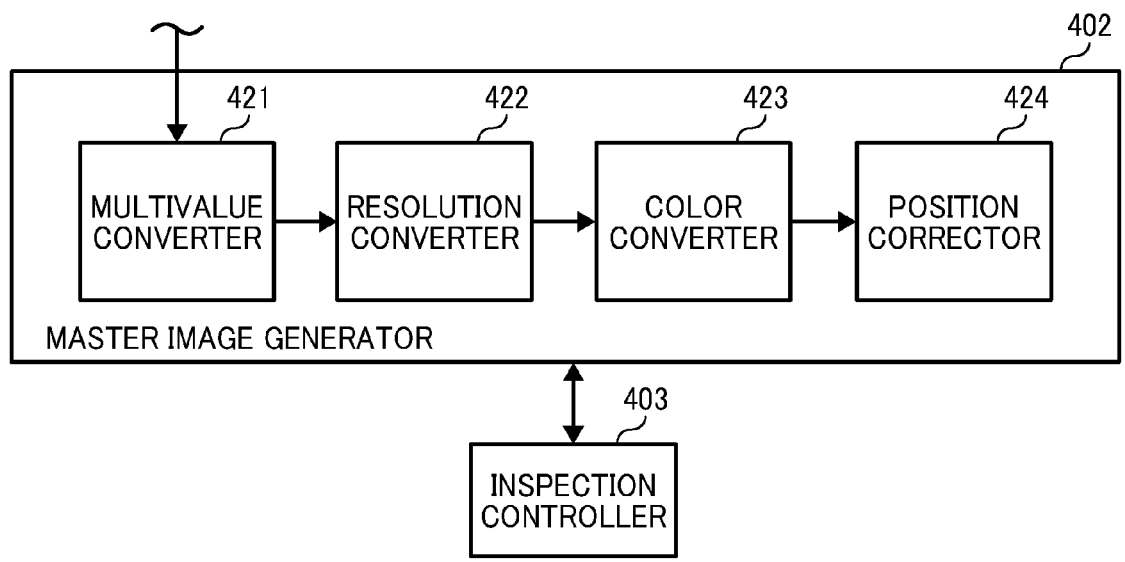
FIG. 5 is a schematic block diagram illustrating a functional structure of a master image generator of the inspection apparatus of FIG. 3, according to an example embodiment of the present invention.

Referring now to FIG. 5, a functional structure of the master image generator 402 is explained according to an example embodiment of the present invention. As illustrated in FIG. 5, the master image generator 402 includes a multivalue converter 421, a resolution converter 422, a color converter 423, and a position corrector 424. The master image generator 402 may be implemented by the specialized device 80.

The multivalue converter 421 obtains the binary image from the engine controller 2, and converts the binary image into a multivalue image. In this example, the tones of the multivalue image generated by the multivalue converter 421 is the same in number with the tones of the read image generated by the reading device 302. Further, each pixel in the multivalue image is expressed by eight bits of CMYK colors, with resolution of 1200 dpi (dots per inch).

The resolution converter 422 applies resolution conversion to the multivalue image generated by the multivalue converter 421 to output a halftone image. The halftone image is a multivalue image in which each image pixel is expressed by eight bits of CMYK colors, with resolution of 200 dpi. The resolution converter 422 converts resolution of the multivalue image such that the converted multivalue image has a resolution that matches the resolution of the read image generated by the reading device 302.

The color converter 423 applies color conversion to the halftone image generated by the resolution converter 422 to generate a master image. The master image is a multivalue image in which each image pixel is expressed by eight bits of RGB colors (total of 24 bits), with resolution of 200 dpi. In this manner, the multivalue image, i.e., the master image, has a data format that is equal to the data format of the read image generated by the reading device 302.

Figure 6A:
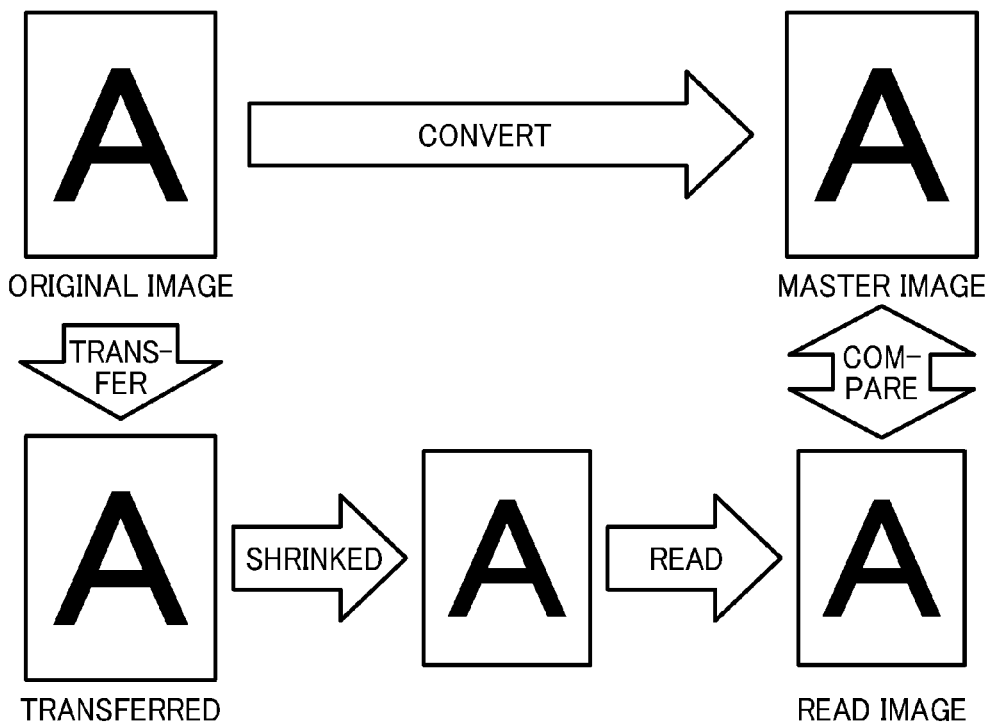
FIGS. 6A and 6B are an illustration for explaining the positional shifts of pixels in a read image with respect to a master image, according to an example embodiment of the present invention.
Figure 6B:
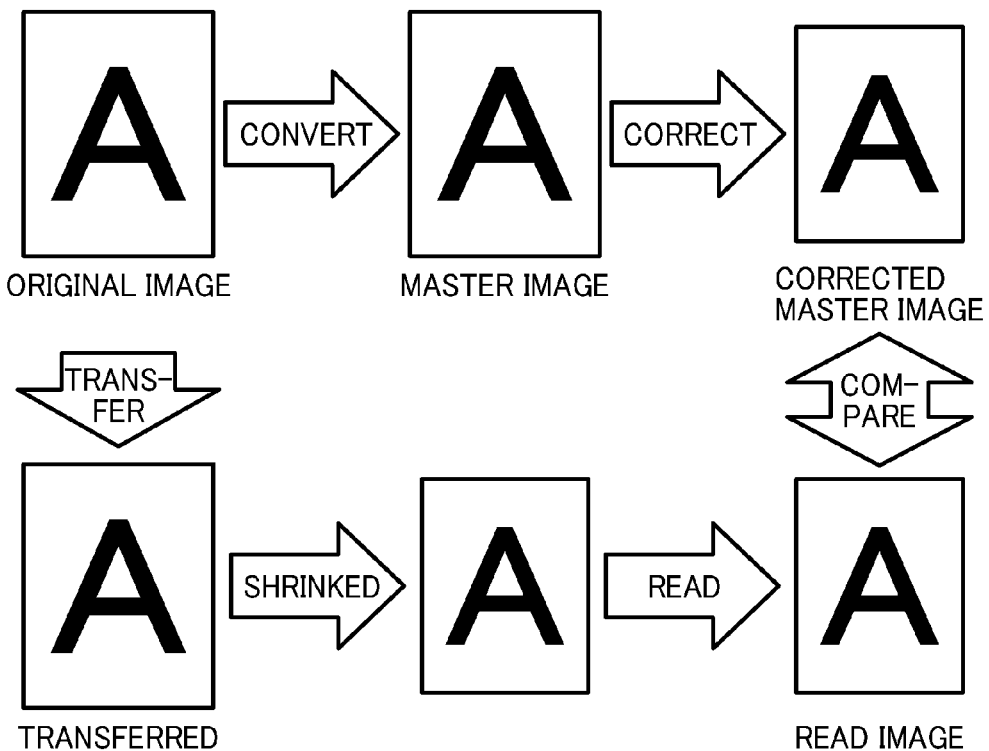

The position corrector 424 corrects the pixel positions of the master image such that the pixel positions of the master image match the pixel positions of the read image. Referring now to FIGS. 6A and 6B, example operation of correcting the pixel positions of the master image with respect to the read image is explained.

FIG. 6A illustrates an example case in which the positional shift is observed between the master image and the read image, and the pixel positions of the master image are not corrected. As illustrated in FIG. 6A, an image is formed on an intermediate transfer body such as the transfer belt 105 (FIG. 4) based on original image data ("original image"). In this example, the original image data is the binary image generated by the engine controller 2. The image is then transferred from the intermediate transfer body onto a recording sheet and output as a printed image ("transferred image").

Assuming that water is evaporated from the recording sheet as the recording sheet is transferred through the fixing device 116, the recording sheet may shrink in size, causing the image formed thereon to shrink as well. The reading device 302 reads the printed image formed on the recording sheet, which is being output, into the read image. The read image ("read image") thus has a size smaller than that of the original image.

The master image generator 402 converts the original image using the multivalue converter 421, the resolution converter 422, and the color converter 423 to generate the master image, such that the master image is generated in size that is the same as that of the original image. Assuming that the inspection apparatus 4 compares between the master image and the read image, the inspection apparatus 4 is not able to inspect the printed image (read image) with high accuracy as the master image and the read image differ in size. More specifically, the read image has a size smaller than that of the master image, since the printed image formed on the recording sheet becomes smaller as the recording sheet shrinks.

In order to improve the accuracy in inspection, as illustrated in FIG. 6B, the position corrector 424 corrects the master image generated from the original image according to the degree of shrinking (the degree of size reduction) of the read image. The read image, which is reduced in size, is compared with the corrected master image having the same size as that of the read image. This allows the inspection apparatus 4 to inspect the read image with improved accuracy, as the pixel positions match between the corrected master image and the read image.

To correct the master image based on the degree of size reduction of the read image, the position corrector 424 may extract a plurality of reference points, respectively, from the master image and the read image. Based on comparison of the positions of the reference points between the read image and the master image, a correction parameter for correcting the master image is calculated such that the master image may be enlarged or reduced in size, or the skew in the master image may be corrected.

More specifically, as the reference point is specified in the master image, the reference point that corresponds to the specified reference point of the master image is searched in the read image, by pattern matching. If the master image and the read image differ in size, the processing time required for pattern matching increases. If the processing time for pattern matching increases, the overall productivity in print processing, which may be expressed in page per minute (ppm), decreases. In order to increase the productivity in print processing, the processing time required for pattern matching needs to be reduced. To reduce the processing time for pattern matching, in this example, the position corrector 424 corrects the pixel positions of the master image or the read image, such that the master image and the read image match in pixel position before pattern matching is executed. For example, the master image having the original image size or the read image having the smaller size may be corrected in size such that the master image and the read image are substantially the same in size.

To make the pixel positions between the master image and the read image to be equal, the size of the image or the pixel positions of the image need to be corrected, while taking into account the degree of shrinking of the read image. In this example case illustrated in FIGS. 6A and 6B, the degree of shrinking of the read image, i.e., the printed image, depends on how much water the recording sheet has contained before the toner image is transferred to the recording sheet. The amount of water contained in the recording sheet may change based on environment conditions such as temperature and humidity within the print processor 301 and a number of recording sheets stored in the paper tray 101, which may be changed over time. For example, as the recording sheet is transferred through the fixing device 116 (FIG. 4), water contained in the recording sheet may evaporate due to heat applied to the recording sheet, causing the printed image to shrink in size or skewed. The degree of shrinking may depend on the amount of water contained in the recording sheet before the image is transferred, and temperature of the fixing device 116. The amount of water contained in the recording sheet before the image is transferred may be changed over time, according to temperature or humidity of the print processor 301 and a number of recording sheets stacked on the paper tray 101. The temperature of the fixing device 116 may increase when a predetermined time period elapses after the power of the print processor 301 is turned on. As described above, the degree of shrinking of the printed image is thus attributable to the temporal change in print processing conditions, such that the positional shift that is reflected by the degree of shrinking may be estimated based on an accumulated number of printed images formed by the print processor 301.

Referring now to FIGS. 7A and 7B, the relationship between the positional shifts in the printed image, i.e., the read image, with an accumulated number of printed images, is explained according to an example embodiment of the present invention.

Since heat applied to the recording sheet by the fixing device 116 is greater in case of double-sided printing (FIG. 7B) than in case of single-sided printing (FIG. 7A), the value of positional shift in the read image for the double-sided printing tends to be greater than that of the single-sided printing (FIG. 7A). The positional shift in the read image that is observed right after the power of the print processor 301 is turned on (such as when a number of pages is "1"), is assumed to be attributable mainly to the stationary noise. The value of the positional shift when a number of pages is "1" is previously set by default, for example, based on empirical data.

As the temperature and humidity within the print processor 301 increase after sequentially printing a number of images, the value of positional shift changes. As the temperature of the fixing device 116 increases with the increased running time of the print processor 301, heat applied to the recording sheet increases, thus causing more water to evaporate such that the degree of shrinking in the printed image increases. This causes the value of positional shift in the printed image to increase. Referring to FIGS. 7A and 7B, the positional shifts in the X-direction and the Y-direction, which are each expressed in number of pixels in the image, increase as a number of printed pages increase. When the temperature of the fixing device 116 reaches a predetermined level, the value of the positional shift in the printed image is kept around a predetermined value.

In this example, as the print processor 301 sequentially outputs a number of printed images, to process a currently printed image, the inspection apparatus 4 obtains a correction parameter that was calculated for the previous page based on pattern matching of the previously printed image and the master image as a correction parameter for correcting the master image or the currently printed image, unless there is an unexpected change in the positional shift of the previously printed image.

The position corrector 424 uses a correction parameter, which is previously calculated for the previously printed image (the previously read image), to correct the master image or the currently printed image (the currently read image) to substantially match the pixel positions of the master image and the currently printed image (the currently read image). After correcting the pixel positions of the master image or the currently printed image, the master image and the currently printed image are compared using pattern matching to generate a correction parameter for correcting the positional shift in the currently printed image. The correction parameter obtained for the currently printed image is stored for later use such that the position corrector 424 can obtain the correction parameter to process a next printed image. By correcting the master image or the read image using a correction parameter that is previously calculated for the previously printed image, the pixel positions of the master image and the read image can be substantially matched before applying pattern matching, thus increasing the processing speed in pattern matching.

Referring now to FIG. 8, operation of correcting the pixel positions of the master image, performed by the position corrector 424, is explained according to an example embodiment of the present invention. The position corrector 424 obtains the master image from the color converter 423, and corrects the position of each pixel in the master image using a correction parameter for a previously printed image.

At S801, the position corrector 424 reads the master image generated by the color converter 423, under control of the inspection controller 403.

At S802, the position corrector 424 updates the value of a correction parameter to be used for correcting the pixel positions of the master image, under control of the inspection controller 403.

More specifically, at S802, the position corrector 424 obtains a correction parameter that is previously calculated for the previously read image under control of the inspection controller 403. In this example, the CPU 10 that operates according to the inspection control program refers to a register value to obtain a correction parameter that is previously calculated based on comparison between the previously read image and the master image. As described above, the previously read image or the master image is corrected before being compared.

In case the currently read image is the first page, which is to be printed right after the power of the print processor 301 is turned on, a correction parameter for the previously read image cannot be obtained. In such case, the position corrector 424 refers to a correction parameter that is previously set by default and stored in a memory. The default value of correction parameter is assumed to be set so as to correct the positional shift due to the stationary noise.

When a correction parameter for the previously read image, which is obtained for a last page that is printed right before processing of the currently read image, is stored, the position corrector 424 obtains the stored correction parameter as the updated correction parameter.

At S803, the position corrector 424 corrects the master image using the updated correction parameter, which is obtained at S802. In this example, the correction parameter includes a plurality of correction parameter values that respectively specify an enlargement or reduction ratio in the image, the degree of shift in vertical or horizontal direction, the degree of skew, a rotation angle of the image, etc. According to the obtained correction parameter, the position corrector 424 applies enlargement or size reduction of image, shifting of image in the vertical or horizontal direction, skew correction, or image rotation, such that the pixel positions of the master image are corrected.

At S804, the position corrector 424 extracts a reference point in the corrected master image to obtain coordinate information indicating the coordinate value of the extracted reference point. For example, the position corrector 424 may detect a corner of an image section in the master image that is subjected for pattern matching, using an image processing filter such as a Laplacian filter or a corner detection filter. The position corrector 424 further extracts the detected corner as a reference point. Alternatively, the position corrector 424 may detect a marker such as a register mark, for example, in case of offset printing. The position corrector 424 sends the corrected master image, and reference point information indicating the position of the reference point in the corrected master image such as the coordinate information of the reference point, to the inspection controller 403, and the operation ends. In this example, a plurality of reference points may be obtained such as every corner of an image section subjected for pattern matching.

When the corrected master image and the reference point information are respectively obtained, the inspection controller 403 causes the comparator 404 to perform operation of comparing between the read image and the corrected master image as illustrated in FIG. 9.

Referring to FIG. 9, at S901, the comparator 404 obtains the corrected master image and the reference point information under control of the inspection controller 403, and extracts a reference point in the currently read image by pattern matching. The reference point in the currently read image to be extracted should match the reference point specified in the corrected master image.

Figure 10:
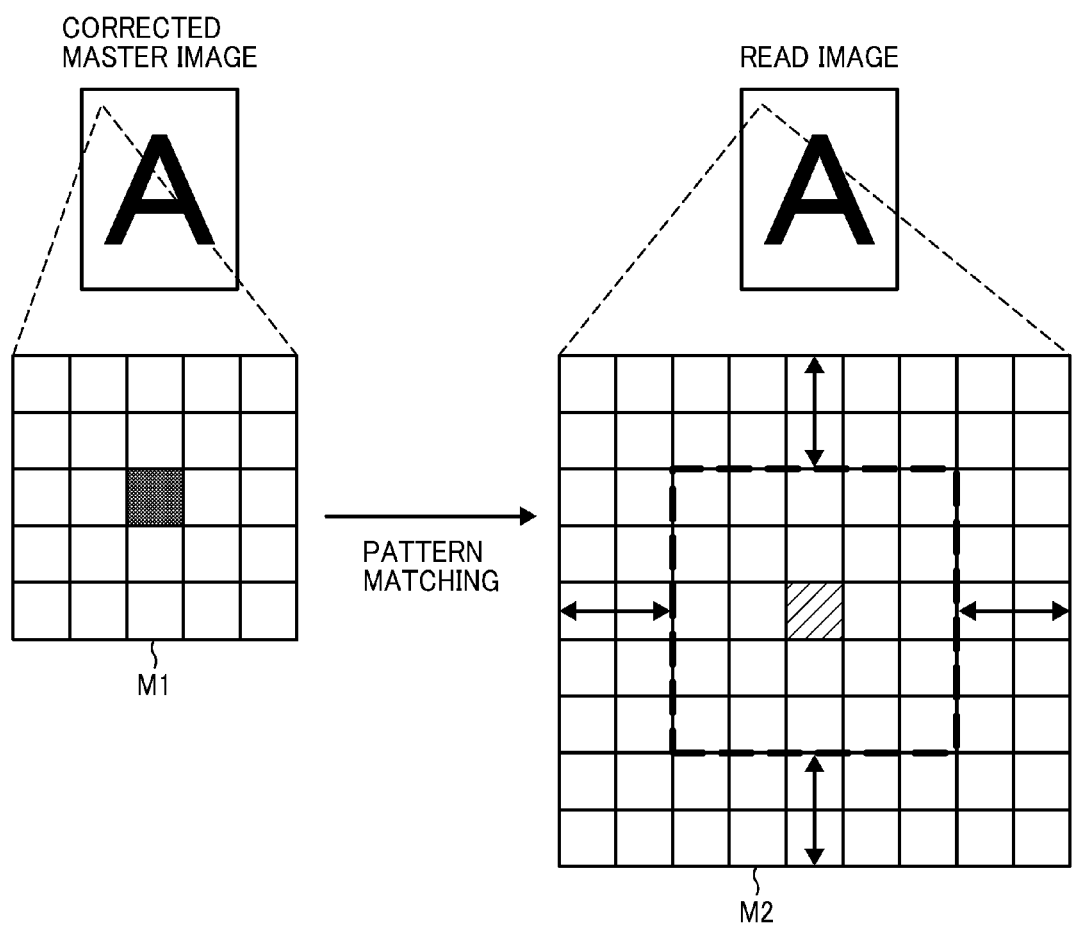
FIG. 10 is an illustration for explaining operation of extracting a reference point from the read image, which corresponds to a reference point in the corrected master image, by pattern matching, according to an example embodiment of the present invention.

Referring now to FIG. 10, example operation of extracting a reference point in the read image that matches the reference point in the master image is explained. The section M1 of the corrected master image is an image section having the reference point in its center (shown in the shaded color) and its peripheral pixels. The section M2 of the read image is an image section having the reference point that corresponds to the reference point of the corrected master image in its center (shown in diagonal line), and its peripheral pixels. The reference point in the read image can be specified using the reference point information.

As illustrated in FIG. 10, the comparator 404 treats the section M1 having the pixels that surround the reference point as a target area. The comparator 404 further specifies the reference point in the read image that is located at the coordinate position that corresponds to the coordinate position of the reference point in the master image, using the reference point information. The comparator 404 extracts the section M2, which is larger than the section M1 by two pixels in the directions of upward, downward, right, and left. The comparator 401 performs pattern matching to determine whether any pixel in the section M2 matches the pixel at the reference point in the section M1. More specifically, the comparator 404 searches through the section M2 of the read image for the section M1 of the corrected master image to extract the reference point in the read image.

Since the position of each pixel in the read image is caused to match the position of each pixel in the corrected master image before starting pattern matching, theoretically, the reference point in the read image should be located at a position that corresponds to the position where the reference point is located in the master image. In order to make sure that the reference point is extracted even though the read image and the corrected master image do not match, in this example, the section M2 subjected for search is made larger than the size of the section M1. Accordingly, in the example case of FIG. 10, pattern matching is performed for one reference point for 25 times at most, which is substantially smaller compared to the case in which pattern matching is performed without correcting the master image.

In alternative to specifying the sections M1 and M2, pattern matching may be performed by setting a starting point. For example, the position in the read image that corresponds to the position of the reference point in the corrected master image may be specified and set as the starting point. The comparator 401 firstly determines whether the pixel at the starting point in the read image matches the pixel at the reference point in the corrected master image. When they do not match, the comparator 401 specifies a pixel that is adjacent to the pixel at the starting point, and determines whether the adjacent pixel matches the pixel at the reference point in the corrected master image. This process of shifting the target position may be repeated until the reference point is extracted from the read image.

Referring back to FIG. 9, at S902, the comparator 404 compares the reference point in the corrected master image with the reference point in the read image to calculate a correction parameter, under control of the inspection controller 403. In one example, this correction parameter may be used to further correct the positional shift in the read image with respect to the corrected master image. More specifically, the correction parameter obtained at S902 is used to correct the positional shift between the previously printed image and the currently printed image.

Further, the correction parameter obtained at S902 is stored in a memory such as the RAM 20 or set as a register value of the CPU 10. When performing operation of correcting the master image for a next printed image to be processed as described above referring to FIG. 8, the correction parameter obtained at S902 is read at S802 as a correction parameter for the previously printed image to update the correction parameter to be used for processing the next printed image.

Referring back to FIG. 9, at S903, the comparator 404 compares between the corrected master image and the read image to generate and output a differential image. More specifically, the comparator 404 obtains the differences in pixel value between each pixel in the corrected master image and each pixel in the read image, and generates a differential image containing the pixels having the obtained difference value. Assuming that the read image, i.e., the printed image is in good quality, the difference between the corrected mater image and the read image is expected to have smaller values as the halftone value of each pixel is nearly the same for the read image and the corrected master image. This results in each pixel of the differential image to have a small value near "0". When the read image is not in good quality, the difference between the corrected master image and the read image is expected to have larger values as the halftone value of each pixel is different for the read image and the corrected master image. This results in each pixel of the differential image to have a larger value.

At S904, the comparator 404 compares the differential image, or the difference value, with a predetermined threshold to determine whether the printed image is a defect image. For example, the comparator 404 may set a threshold for each of R, G, and B planes, and compares the differential value with the threshold for each of R, G, and B planes. Alternatively, the comparator 404 may calculate the shift in brightness, hue, and saturation ("color shift") based on the difference for each one of R, G, and B planes, and compares the calculated color shift with a threshold to determine whether the read image is a defect image. When the difference exceeds the threshold, the comparator 404 determines that the read image is a defect image. When the difference does not exceed the threshold, the comparator 404 determines that the read image is sufficiently in good quality. The inspection result obtained at S904 may be output to a user, for example, through the LCD 60 as a message under control of the inspection controller 403. Alternatively, the inspection result may be output in the form of a sound such as a beep sound only when the defect image is detected. After the inspection result is output, the operation of FIG. 9 ends.

When the inspection result of the comparator 405 indicates that the read image is a defect image, the inspection controller 404 may send a request for re-printing the image to the engine controller 2. Based on this request, the engine controller 2 instructs the print engine 3 to print the image on the recording sheet.

As described above referring to FIGS. 1 to 10, the inspection apparatus 4 uses a correction parameter that is previously obtained for a previously read image to cause the pixel positions of the master image and the read image to substantially match before performing pattern matching to extract a reference point. Since the pixel positions of the master image and the read image substantially match, the processing time required for pattern matching to extract a reference point is greatly reduced. To illustrate how effectively the reference point can be extracted by the inspection apparatus 4, operations of extracting a reference point in the read image are explained referring to FIGS. 11A to 11C. For the descriptive purposes, it is assumed that the inspection apparatus 4 inspects a plurality of printed images, which are sequentially output, page by page. Further, the positional shifts in the printed images increase with the increase in an accumulated number of printed pages, as illustrated in FIG. 7A.

Figure 11A:
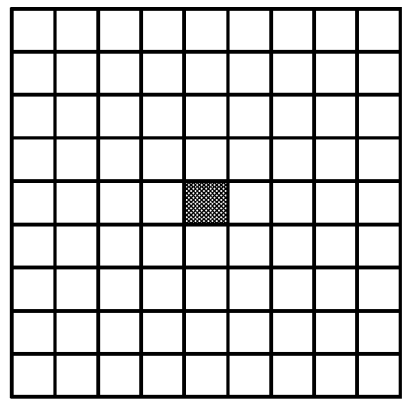
FIGS. 11A to 11C are an illustration for explaining operation of sequentially performing pattern matching to extract a reference point from the read image, which corresponds to a reference point in the corrected master image, according to an example embodiment of the present invention.

FIG. 11A illustrates the section M2 of the read image, i.e., the printed image that is obtained when an accumulated number of printed pages is one. In such case, the reference point in the read image is shifted by 10 pixels in the X direction and by 7 pixels in the Y direction, mainly due to the stationary noise. Since the master image is corrected using a correction parameter for correcting the stationary noise, the reference point in the section M1 of the corrected master image should match the reference point in the section M2 of the read image. In one example of performing pattern matching based on searching through the section M2 for the section M1, as described above referring to FIG. 10, pattern matching may be performed for 25 (5×5) times at most to make sure that the reference point is surely extracted. In another example of performing pattern matching based on the starting point, pattern matching may be performed only once as the reference point in the read image matches the reference point in the corrected master image.

Figure 11B:
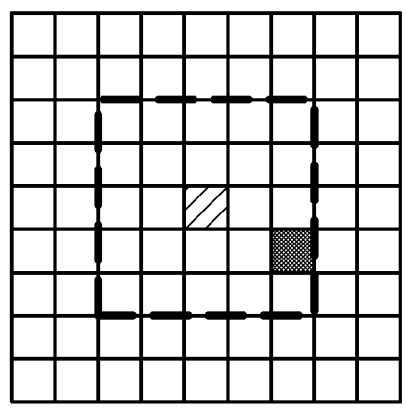

FIG. 11B illustrates the section M2 of the read image, i.e., the printed image that is obtained when an accumulated number of printed pages is 1000. In such case, the reference point in the read image (shown in shaded color) is shifted by 2 pixels in the X direction and by 1 pixel in the Y direction, with respect to the reference point in the corrected master image (shown in diagonal lines). Assuming that pattern matching is to be performed through the section M2 of the read image for the section M1, the section M2 needs to at least contain surrounding pixels that are extended by 2 pixels in the directions of upward, downward, right, and left, from the pixel located at the position that corresponds to the reference point in the corrected master image. As described above referring to FIG. 10, the section M2 may be further extended to include surrounding pixels that are further extended by 2 pixels in the directions of upward, downward, right, and left to make sure that the reference point is surely extracted. Accordingly, pattern matching may be performed for 81 (9×9) times at most. Alternatively, in case of performing pattern matching based on the starting point, pattern matching may be performed for at least 6 times to 25 times to extract the reference point from the read image.

Figure 11C:
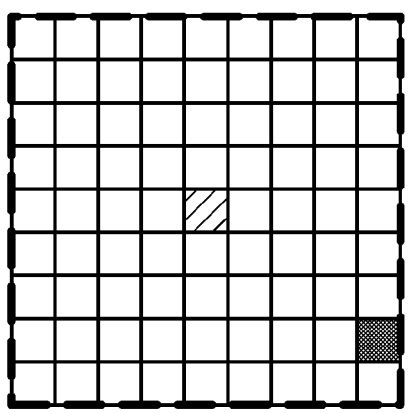

FIG. 11C illustrates the section M2 of the read image, i.e., the printed image that is obtained when an accumulated number of printed pages is 10,000. In such case, the reference point in the read image (shown in shaded color) is shifted by 4 pixels in the X direction and by 3 pixels in the Y direction, with respect to the reference point in the corrected master image (shown in diagonal lines) that is used for the previously read image.

For the descriptive purposes, it is assumed that the master image is corrected only for the positional shift attributable to the stationary noise. In such case, the reference point in the corrected master image stays the same irrespective of an accumulated number of printed pages, such that the degree of shift of the reference point in the read image is 4 pixels in the X direction and 3 pixels in the Y direction, as illustrated in FIG. 11C. Assuming that pattern matching is to be performed for the section M2 of the read image, the section M2 needs to at least contain surrounding pixels that are extended by 4 pixels in the directions of upward, downward, right, and left, from the pixel located at the position that corresponds to the reference point in the corrected master image. As described above referring to FIG. 10, the section M2 may be further extended to include surrounding pixels that are further extended by 2 pixels in the directions of upward, downward, right, and left to make sure that the reference point is surely extracted. Accordingly, pattern matching may be performed for 169 (13×13) times at most. This is about 6 times greater than the maximum number of pattern matching that may be performed in case of FIG. 11A. Alternatively, in case of performing pattern matching based on the starting point, pattern matching may be performed for at least 20 times to 81 times to extract the reference point from the read image.

As described above referring to FIG. 11C, while correcting the positional shift attributable to the stationary image may be effective for some cases, if printing is sequentially performed, the positional shift due to the non-stationary noise tends to increase. This causes the processing time required for pattern matching to greatly increase. Accordingly, the overall processing time required for inspecting the printed image greatly increases such that productivity in print processing, which may be expressed in ppm, tends to be lower.

In view of this, as described above referring to FIG. 8, the position corrector 424 of the inspection apparatus 4 corrects the master image using a correction parameter, which is previously obtained for the previously printed image, to generate the corrected master image. Since the corrected mater image is corrected with respect to the previously corrected master image, the corrected master image and the read image can be matched with improved accuracy. As the positional shift of the read image with respect to the corrected master image is made smaller, the processing time required for pattern matching greatly reduces.

For example, in the example case illustrated in FIG. 11C, the reference point in the corrected master image (shown in diagonal lines) is updated using a correction parameter that is obtained for the previously printed image (when the accumulated number of printed pages is "1000"). In such case, the reference point in the read image (shown in shaded color) is shifted by 2 pixels in the X direction and by 2 pixels in the Y direction, with respect to the reference point in the corrected master image (shown in shaded color in FIG. 11B). In one example, assuming that pattern matching is to be performed through the section M2 of the read image for the section M1, the section M2 needs to at least contain surrounding pixels that are extended by 2 pixels in the directions of upward, downward, right, and left, from the pixel located at the position that corresponds to the reference point in the corrected master image. As described above referring to FIG. 10, the section M2 may be further extended to include surrounding pixels that are further extended by 2 pixels in the directions of upward, downward, right, and left to make sure that the reference point is surely extracted. Accordingly, pattern matching may be performed for 81 (9×9) times at most. Alternatively, in case of performing pattern matching based on the starting point, pattern matching may be performed for at least 9 times to 25 times to extract the reference point from the read image.

In another example, assuming that the positional shift in the read image is observed when an accumulated number of printed pages is 20,000. In such case, only if the master image is corrected using a correction parameter for the stationary noise, the reference point in the read image is shifted by 6 pixels in the X direction and by 4 pixels in the Y direction. In such case, pattern matching needs to be performed for at least 35 (7×5) times. When the master image is corrected using a correction parameter for the previously printed image, the reference point in the read image is shifted by 1 pixel in the X direction and by 0 pixel in the Y direction. Accordingly, pattern matching needs to be performed for at least 2 times (2×1), such that the processing time for pattern matching is greatly reduced.

While the above-described example case illustrates operation of inspecting a plurality of printed images for the single-sided printing, the inspection apparatus 4 performs operation of inspecting a plurality of printed images for the double-sided printing in a substantially similar manner. In such case, however, the default value of correction parameter that is previously prepared for the double-sided printing may be used.

As described above referring to FIGS. 1 to 11, the inspection apparatus 4 corrects a master image using a correction parameter that is previously obtained for a previously read image to correct the position of each pixel in the corrected master image so as to substantially match with the position of each pixel in a currently read image. The inspection apparatus 4 further compares between the currently read image and the corrected master image to further detect a positional shift in the currently read image with respect to the corrected master image to obtain a correction parameter for the currently read image. In this manner, the position shift in the currently read image that is attributable to the non-stationary noise, such as the noise that may change over time, may be corrected, thus improving the inspection accuracy while reducing the overall inspection processing time.

In this example, the previously printed image may be the printed image formed on the last page of the printed sheet, which is output just before outputting the currently printed image. Alternatively, the previously printed image may be the printed image formed on any page of the printed sheet, which is output before outputting the currently printed image.

The above-described operation of correcting the master image and inspecting the read image may be performed in various other ways.

In the above-described example, the correction parameter for correcting the master image is constantly updated as described above referring to S902 of FIG. 9 and S802 of FIG. 8. Alternatively, the inspection apparatus 4 may calculate an average value of correction parameters that are obtained for the last 10th to 100th printed pages. In the example case illustrated in FIG. 7A or 7B, it is expected that the positional shift does not rapidly change between the time when the accumulated number of printed pages is 10 and the time when the accumulated number of printed pages is 100. By using the average value of correction parameters, any negative influence that may be caused due to the unexpected positional shift may be suppressed, thus reducing the overall processing time required for pattern matching.

Further, as described above referring to FIGS. 7A and 7B, the change in positional shift with respect to the accumulated number of printed pages tends to be smaller, as the accumulated number of printed pages becomes greater. Based on this observation, a number of printed pages that is used for averaging the correction parameters does not have to be fixed, but may be changed according to the accumulated number of printed pages. For example, in the example cases of FIGS. 7A and 7B, the degree of change in positional shift is relatively large for the range between the time when the accumulated number of printed pages is 1 and the time when the accumulated number of printed pages is 1000. For this reasons, a number of printed pages that is used for averaging the correction parameters may be set to 10 pages for that range. As the degree of change in positional shift becomes smaller as the accumulated number of printed pages increases, a number of printed pages that is used for averaging the correction parameters may increase. For the range between the time when the accumulated number of printed pages is 20,000 and the time when the accumulated number of printed pages is 100,000, a number of printed pages that is used for averaging the correction parameters may be set to the maximum value as there is no change or little change in the positional shift.

In the above-described example, for the first page to be printed after the power of the print processor 301 is turned on, a correction parameter that is previously obtained for correcting the stationary noise is used to correct the pixel positions of the master image. The correction parameter for correcting the stationary noise may be obtained based on empirical data. In alternative to the time when the first page is to be printed after the power of the print processor 301 is turned on, the inspection apparatus 4 may use a correction parameter for correcting the stationary noise when the first page is to be printed after the print processor 301 switches its operation mode from the energy save mode or the sleep mode to the normal operation mode.

In some cases, however, the stationary noise may change depending on the environmental conditions such as temperature or humidity. As long as a correction parameter is updated with a calculated correction parameter, the positional shift in the read image with respect to the corrected master image can be corrected with improved accuracy using the calculated correction parameter. However, for the first printed page, the positional shift in the read image with respect to the corrected master image may not be corrected, if the default correction parameter value is not able to correct the stationary noise.

In view of this, when the first image is to be processed after the power of the print processor 301 is turned on, the inspection controller 403 may cause the comparator 404 to perform S902 of calculating a correction parameter based on comparison between the corrected master image and the read image. The corrected master image is the master image, which is corrected using the default correction parameter that is previously obtained for correcting the positional shift due to the stationary noise. The inspection controller 403 further inputs the calculated correction parameter to the master image generator 402 to cause the master image generator 402 to perform operation of FIG. 8 to update the default correction parameter with the calculated correction parameter, and to correct the corrected master image using the calculated correction parameter. The inspection controller 403 then causes the comparator 404 to perform S903 and S904 using re-corrected master image. Since the correction parameter is updated after the power of the print processor 301 is turned on, the read image can be inspected using the re-corrected mater image with improved accuracy.

Further, as described above, the correction parameter obtained at S902 for the previously printed image is used as a correction parameter for correcting the currently printed image at S802. While the correction parameter for the previously printed image can sufficiently correct the positional shift in the currently read image with respect to the master image, the correction parameter for the previously printed image may have a large value indicating that the positional shift in the previously printed image is large with respect to the master image. In such case, it may not be appropriate to apply the correction parameter for the previously printed image to correct the master image for the currently printed image, as the positional shift in the previously printed image may have an unexpectedly large value. In such case, the inspection controller 403 may determine whether to correct the master image for the currently printed image using the calculated correction parameter, as described below referring to FIG. 12.

Figure 12:
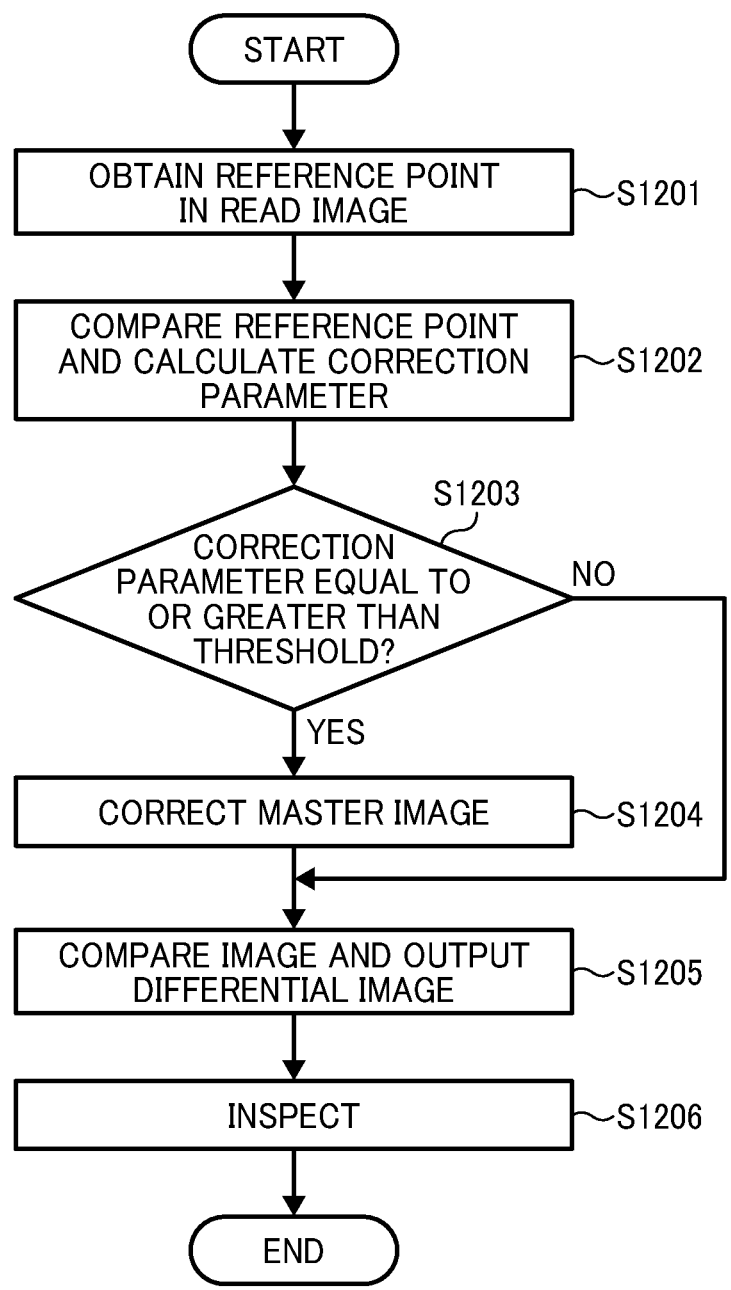
FIG. 12 is a flowchart illustrating operation of inspecting a printed image using the corrected master image, performed by the inspection apparatus of FIG. 1, according to an example embodiment of the present invention.

FIG. 12 is a flowchart illustrating operation of re-correcting the pixel positions of the corrected master image using the calculated correction parameter, performed by the comparator 404 under control of the inspection controller 403, according to an example embodiment of the present invention. The inspection apparatus 4 performs operation of FIG. 12 after performing operation of FIG. 8.

S1201 to S1202 are performed in a substantially similar manner as described above referring to S901 to S902 of FIG. 9.

At S1203, the inspection controller 403 compares the calculated correction parameter obtained at S1202 with a predetermined threshold to determine whether the calculated correction parameter is equal to or greater than the predetermined threshold. The value of predetermined threshold is previously stored in a memory such as the ROM 30. When the calculated correction parameter is equal to or greater than the predetermined threshold ("YES" at S1203), the inspection controller 403 determines that the positional shift of the currently read image with respect to the corrected master image is large, and the operation proceeds to S1204.

At S1204, the inspection controller 403 inputs the calculated correction parameter and the corrected master image to the master image generator 402 to cause the master image generator 402 to perform operation of FIG. 8. The master image generator 402 updates the correction parameter with the calculated correction parameter, and corrects the pixel positions of the corrected master image using the calculated correction parameter to generate the re-corrected master image. The re-corrected master image is sent to the comparator 404 through the inspection controller 403.

When the correction parameter is less than the predetermined threshold ("NO" at S1203), the inspection controller 403 determines that the positional shift of the currently read image with respect to the corrected master image is sufficiently small, and the operation proceeds to S1205.

S1205 and S1206 are performed in a substantially similar manner as described above referring to S903 and S904 of FIG. 9, and the operation ends.

As described above referring to FIG. 12, when the calculated correction parameter exceeds the predetermined threshold, the inspection apparatus 4 corrects the corrected master image again using the calculated correction parameter. This allows the inspection apparatus 4 to inspect the currently printed image with improved accuracy, even when the correction parameter for the previously read image has an unexpected value due to the unexpected change in positional shift of the previously read image.

The above-described operation of FIG. 12 may be performed in various other ways. For example, determination at S1203 may be performed based on whether the calculated correction parameter is 0 or not. In such case, it is determined that the absolute value of the calculated correction parameter is equal to or greater than "0". By setting the threshold value to "0", the corrected master image is corrected again as long as there is the positional shift between the corrected master image and the currently read image.

Further, in the above-described example of FIG. 12, the correction parameter that is calculated at S1202 is stored in a memory to be used for correcting the master image for the next printed image. Alternatively, when the calculated correction parameter exceeds the predetermined threshold at S1203, such correction parameter may not be used for correcting the master image for the next printed image. More specifically, when the calculated correction parameter exceeds the predetermined threshold, the inspection controller 403 may cause the position corrector 424 to use a correction parameter other than the correction parameter that is just calculated for the next printed image. By not using the correction parameter that exceeds the threshold, any negative influence that may be attributable to the unexpected change in positional shift may be suppressed.

Further, the calculated correction parameter that exceeds the threshold may be excluded from being used to obtain the average value of correction parameters that are obtained for a specific range of number of printed pages, such as the last 10 to 100 printed pages that have been printed.

Further, when the calculated correction parameter exceeds the threshold at S1203, the average value of the correction parameters obtained from a predetermined number of last printed pages, such as the last 10 to 100 printed pages, may be used as a correction parameter for the currently printed page.

Further, the inspection apparatus 4 may change the value of correction parameter to be used, depending on whether the printed image is single-sided or double-sided. For example, the inspection apparatus may determine whether the currently read image is single-sided or double-sided, based on information received from the print engine 3 or the engine controller 2. By managing a correction parameter separately for the single-sided printing and the double-sided printing, the correction parameter is calculated with the improved accuracy.

In the above-described examples, the pixel positions of the master image are corrected so as to compensate for the image size reduction caused by shrinking of the recording sheet. More specifically, as illustrated in FIG. 5, the master image generator 402 includes the position corrector 424, which corrects the pixel positions of the master image such that the pixel positions substantially match between the corrected master image and the currently read image.

Alternatively, the reduced size of the read image may be enlarged so as to compensate for the image size reduction. In such case, the master image generator 402 does not correct the master image such that S802 and S803 of FIG. 8 are not performed. For example, the functions of correcting the pixel positions of the master image that are performed by the position corrector 424 do not have to be provided in the master image generator 402. Instead, the comparator 404 of the inspection apparatus 4 further includes a position corrector such that the comparator 404 performs operation of correcting the read image before performing S901 of FIG. 9.

More specifically, the master image generator 402 generates the master image from the binary image, and sends the master image to the inspection controller 403. With the master image, the master image generator 402 may send reference point information indicating the coordinate position of the reference point in the master image. Under control of the inspection controller 403, the comparator 404 obtains the read image, and updates a correction parameter with a correction parameter that is calculated for the previously read image. The comparator 404 corrects the pixel positions of the currently read image using the updated correction parameter. More specifically, according to the obtained correction parameter, the position corrector of the comparator applies enlargement or size reduction of image, shifting of image in the vertical or horizontal direction, skew correction, or image rotation, such that the pixel positions of the read image are corrected. The comparator 404 further performs operation of FIG. 9, using the corrected read image and the master image.

In this example illustrated in FIG. 1, it is assumed that the DFE 1, the engine controller 2, the print engine 3, and the inspection apparatus 4 are each implemented by a separate apparatus. The image forming system of FIG. 1 may be implemented in various other ways.

Figure 13A:
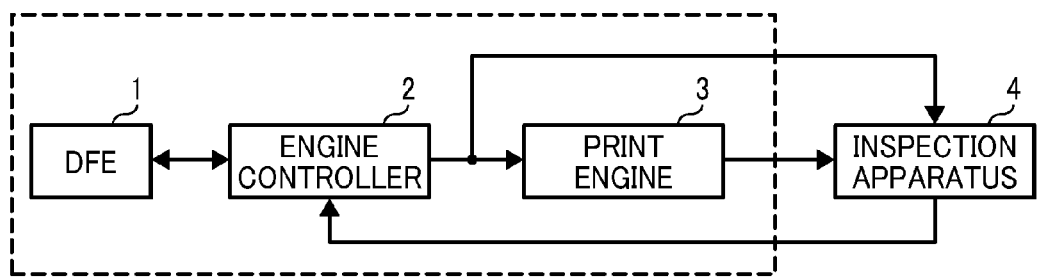
FIG. 13A is a schematic block diagram illustrating a configuration of an image forming system including an inspection apparatus, according to an example embodiment of the present invention.
Figure 13B:
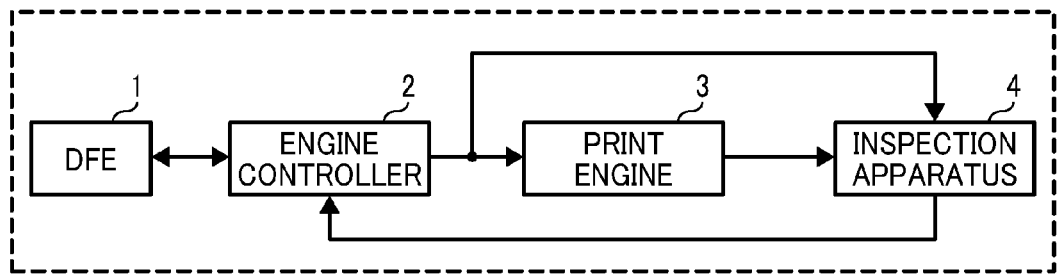
FIG. 13B is a schematic block diagram illustrating a configuration of an image forming system including an inspection apparatus, according to an example embodiment of the present invention.

For example, as illustrated in FIG. 13A, the DFE 1, the engine controller 2, and the print engine 3 may be incorporated into one apparatus functioning as an image forming apparatus such as a printer. In another example, as illustrated in FIG. 13B, the DFE 1, the engine controller 2, the print engine 3, and the inspection apparatus 4 may be incorporated into one apparatus functioning as an image forming apparatus such as a printer.

In the above-described example illustrated in FIG. 1, the DFE 1, the engine controller 2, the print engine 3, and the inspection apparatus 4 are connected through a local interface such as a universal serial bus (USB) or a Peripheral Component Interconnect express (PCIe). Alternatively, the inspection apparatus 4 may be provided at a site that is remotely located from the DFE 1, the engine controller 2, and the print engine 3, as long as the inspection apparatus 4 is capable of communicating with the DFE 1, the engine controller 2, and the print engine 3. For example, the inspection apparatus 4 may be implemented by application that provides the inspection control function to the image forming system or the image forming apparatus through the network.

Figure 14:
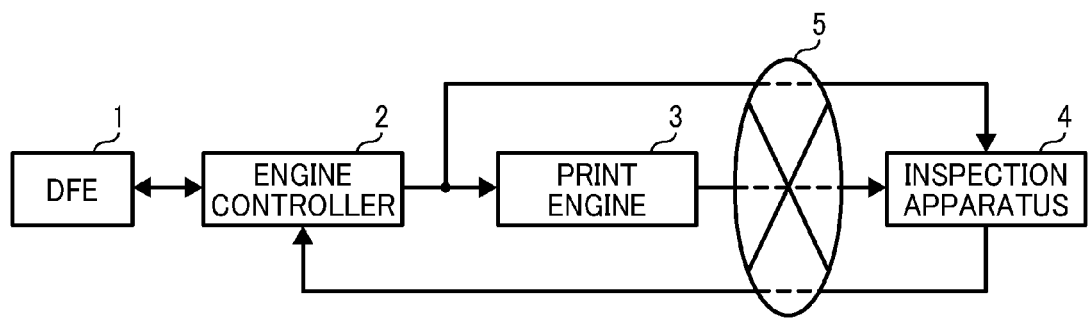
FIG. 14 is a schematic block diagram illustrating a configuration of an image forming system including an inspection apparatus, according to an example embodiment of the present invention.

For example, as illustrated in FIG. 14, the image forming system including the DFE 1, the engine controller 2, and the print engine 3, and the inspection apparatus 4 are connected through a public network such as the Internet. The engine controller 2 and the print engine 3 transmit various data or information to the inspection apparatus 4 through the network 5. The inspection apparatus 4 transmits an inspection result to the engine controller 2 through the network 5. In this manner, the inspection apparatus 4 does not have to be provided at the user site such that the user is able to reduce the initial cost that may be otherwise required to implement the function of inspecting the printed image.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image inspection apparatus that inspects, image by image, a plurality of read images, which are respectively read from a plurality of printed images formed on the respective recording sheets by an image forming apparatus. The image inspection apparatus includes: inspection image generating means for generating an inspection image to be used for inspecting the read image based on an output image used by the image forming apparatus to form the printed image; inspecting means for inspecting the read image based on comparison between the inspection image and the read image; reference point extracting means for searching for an image section including a plurality of pixels surrounding a reference point set in one of the inspection image or the read image, through the other one of the inspection image or the read image, to extract a reference point in the other one of the inspection image or the read image; correction data calculating means for calculating correction data to be used for correcting a positional shift between the inspection image and the read image based on difference between the reference point in the inspection image and the reference point in the read image; and image correcting means for correcting one of the inspection image or the read image based on calculated correction data that is calculated for a previously read image. The reference point extracting means extracts the reference point in one of the inspection image or the read image that is corrected by the image correcting means. The inspecting means compares between the inspection image and the read image, one of the inspection image or the read image being corrected, to inspect the read image.

In one example, the inspection image generating means corresponds to the master image generator 402, which may be implemented by the CPU 10 that operates in cooperation with the inspection control program and/or the specialized device 80. The inspecting means, the reference point extracting means, and the correction data calculating means correspond to the comparator 404, which may be implemented by the CPU 10 that operates in cooperation with the inspection control program and/or the specialized device 80. The image correcting means corresponds to at least a portion of the position corrector, which may be incorporated in the master image generator 402 or the comparator 404.

In one example, the image correcting means corrects the inspection image or the read image based on an average value of the calculated correction data that is calculated for a predetermined number of previously read images.

The correction data calculating means compares between the calculated correction data and a predetermined threshold to output a comparison result. When the value indicated by the calculated correction data that is calculated for the currently read image exceeds the predetermined threshold, the image correcting means corrects the inspection image or the read image based on the average value of the calculated correction data.

The correction data calculating means compares the calculated correction data with the predetermined threshold to output a comparison result. When the value indicated by the calculated correction data that is calculated for the currently read image exceeds the predetermined threshold, the image correcting means re-corrects one of the inspection image or the read image that is corrected with the stored correction data, using the calculated correction data that exceeds the predetermined threshold. The image inspecting means compares between the inspection image and the read image, one of the inspection image or the read image being re-corrected, to inspect the read image.

The correction data calculating means compares the calculated correction data for the currently read image with the predetermined threshold to output a comparison result. When the value indicated by the calculated correction data that is calculated for the currently read image exceeds the predetermined threshold, the image correcting means corrects one of the inspection image or the read image using correction data other than the correction data that exceeds the predetermined threshold.

When inspecting a read image that is processed first after the power of the image forming apparatus is turned on or after an operation mode of the image forming apparatus is changed from an energy save mode to a normal operation mode, the image correcting means corrects one of the inspection image or the read image based on previously determined correction data.

The reference point extracting means searches the currently read image for the image including a plurality of pixels surrounding the reference point set in the corrected inspection image corrected by the image correcting means to extract a reference point in the currently read image. The image inspecting means compares between the corrected inspection image corrected by the image correcting means and the currently read image to inspect the currently read image that reflects the currently printed image.

The reference point extracting means searches the corrected read image corrected by the image correcting means for the image including a plurality of pixels surrounding the reference point set in the inspection image to extract the reference point in the corrected read image. The image inspecting means compares between the inspection image and the corrected read image corrected by the image correcting means to inspect the currently read image that reflects the currently printed image.

In one example, the present invention may reside in an image forming apparatus, which includes image forming means for forming the printed image on the recording sheet; image reading means for reading the printed image formed by the image forming means; and any one of the above-described inspection apparatus.

In one example, the present invention may reside in an image forming system that inspects, image by image, a plurality of read images, which are respectively read from a plurality of printed images formed on the respective recording sheets by an image forming apparatus. The image forming system includes the image forming apparatus, a reading apparatus that reads the plurality of printed images output by the image forming apparatus into the plurality of read images; and an image inspection apparatus that inspects the plurality of read images. The image inspection apparatus includes: inspection image generating means for generating an inspection image to be used for inspecting the read image based on an output image used by the image forming apparatus to form the printed image; inspecting means for inspecting the read image based on comparison between the inspection image and the read image; reference point extracting means for searching for an image section including a plurality of pixels surrounding a reference point set in one of the inspection image or the read image, through the other one of the inspection image or the read image, to extract a reference point in the other one of the inspection image or the read image; correction data calculating means for calculating correction data to be used for correcting a positional shift between the inspection image and the read image based on difference between the reference point in the inspection image and the reference point in the read image; and image correcting means for correcting one of the inspection image or the read image based on calculated correction data that is calculated for a previously read image. The reference point extracting means extracts the reference point in one of the inspection image or the read image that is corrected by the image correcting means. The inspecting means compares between the inspection image and the read image, one of the inspection image or the read image being corrected, to inspect the read image.

In one example, the present invention may reside in a method of controlling an image inspection apparatus, which inspects, image by image, a plurality of read images, which are respectively read from a plurality of printed images formed on the respective recording sheets by an image forming apparatus. The method of controlling includes: generating an inspection image to be used for inspecting the read image based on an output image used by the image forming apparatus to form the printed image; inspecting the read image based on comparison between the inspection image and the read image; extracting a reference point by searching for an image section including a plurality of pixels surrounding a reference point set in one of the inspection image or the read image, through the other one of the inspection image or the read image, to extract a reference point in the other one of the inspection image or the read image; calculating correction data to be used for correcting a positional shift between the inspection image and the read image based on difference between the reference point in the inspection image and the reference point in the read image; and correcting one of the inspection image or the read image based on calculated correction data that is calculated for a previously read image. The step of extracting extracts the reference point in one of the inspection image or the read image that is corrected by the step of correcting. The step of inspecting compares between the inspection image and the read image, one of the inspection image or the read image being corrected, to inspect the read image.

In another example, the present invention may reside in a non-transitory recording medium storing a plurality of instructions which, when executed by a processor, cause the processor to perform any one of the above-described methods.

For example, the present invention may reside in a non-transitory recording medium storing a plurality of instructions which, when executed by a processor, cause the processor to perform a method of inspecting a plurality of read images each of which are read from a plurality of printed images output from an image forming apparatus, the method including: storing a correction parameter for a previously read image in a memory, the correction parameter being calculated to correct a positional shift in the previously read image with respect to a master image generated from image data of a previously printed image; obtaining a currently read image that is read from a currently printed image output from the image forming apparatus; obtaining image data of the currently printed image, which is used by the image forming apparatus to form the currently printed image; generating a master image based on the image data of the currently printed image; correcting pixel positions of one of the currently read image or the master image using the correction parameter for the previously read image to generate a corrected image, the corrected image including a reference point previously set; extracting a reference point in the other one of the master image or the currently read image that is not corrected, which corresponds to the reference point set in the corrected image; calculating a correction parameter for the currently read image, which is capable of correcting a positional shift in the currently read image with respect to the master image, based on difference between the reference point in the corrected image and the reference point in the other one of the master image or the currently read image that is not corrected; inspecting the currently read image based on difference between the corrected image and the other one of the master image or the currently read image that is not corrected to generate an inspection result indicating whether the currently printed image sufficiently reproduces the image data of the currently printed image; and updating the correction parameter for the previously read image that is stored in the memory, with the correction parameter for the currently read image.

What is claimed is:

1. An inspection apparatus configured to inspect a plurality of read images each of which are subsequently read from a plurality of printed images output from an image forming apparatus, the inspection apparatus comprising:
 a memory configured to store a correction parameter for a previously read image read from a previously printed image, the correction parameter being calculated to correct a positional shift in the previously read image with respect to a first master image generated from image data of the previously printed image; and
 a processor configured to,
  obtain a currently read image that is read from a currently printed image output from the image forming apparatus;
  obtain image data of the currently printed image, which is used by the image forming apparatus to form the currently printed image;
  generate a second master image based on the image data of the currently printed image;
  correct pixel positions of one of the currently read image or the second master image using the correction parameter for the previously read image to generate a corrected image, the corrected image including a first reference point previously set;
  extract a second reference point in the other one of the second master image or the currently read image that is not corrected, which corresponds to the first reference point set in the corrected image;
  calculate a correction parameter for the currently read image for correcting a positional shift in the currently read image with respect to the second master image, based on a difference between the first reference point and the second reference point;
  inspect the currently read image based on a difference between the corrected image and the other one of the master image or the currently read image that is not corrected to generate an inspection result indicating whether the currently printed image sufficiently reproduces the image data of the currently printed image;
  calculate an average correction value based on one or more of the correction parameter for the currently read image and correction parameters each obtained for each one of a number of previously read images; and update the correction parameter for the previously read image that is stored in the memory, with the calculated average correction value, wherein the updated correction parameter is to be used for an image to be read subsequent to the currently read image.

2. The inspection apparatus of claim 1, wherein the number of previously read images are respectively read from the a number of previously printed images that are subsequently output prior to outputting of the currently printed image.

3. The inspection apparatus of claim 1, wherein the number of previously read images that is used for calculating the average correction value of correction parameters is set differently based on an accumulated number of the plurality of printed images that are sequentially output from the image forming apparatus.

4. The inspection apparatus of claim 1, wherein
the processor is further configured to compare the correction parameter for the currently read image, with a threshold to output a comparison result, and
when the comparison result indicates that the correction parameter for the currently read image exceeds the threshold, the processor is configured to exclude the correction parameter for the currently read image to be used for calculating the average correction value of correction parameters of the number of previously read images.

5. The inspection apparatus of claim 1, wherein
the processor is further configured to compare the correction parameter for the currently read image, with a threshold to output a comparison result, and
when the comparison result indicates that the correction parameter for the currently read image exceeds the threshold, the processor is further configured to,
correct pixel positions of the corrected image using a correction parameter other than the correction parameter for the previously read image to generate a re-corrected image, and
inspect the currently read image based on difference between the re-corrected image and the other one of the second master image or the currently read image that is not corrected to generate the inspection result.

6. The inspection apparatus of claim 5, wherein the correction parameter other than the correction parameter for the previously read image includes one of:
the correction parameter for the currently read image that is calculated; and
the average correction value of the correction parameters of the number of previously read images each of which are read from a number of previously printed images that are subsequently output prior to outputting of the currently printed image.

7. The inspection apparatus of claim 1, wherein, when the currently read image is a first read image that is read from a first printed image after a power of the image forming apparatus is turned on or after an operation mode of the image forming apparatus is switched from an energy saving mode to a normal operation mode, the processor is configured to correct the pixel positions of one of the currently read image or the second master image using a correction parameter that is set by default as a correction parameter for correcting a positional shift in a read image due to the stationary noise.

8. The inspection apparatus of claim 1, wherein the processor is configured to search through the other one of the second master image or the currently read image that is not corrected, for an image section including a plurality of pixels surrounding a pixel that corresponds to the second reference point in the corrected image, to extract the second reference point in the other one of the master image or the currently read image that is not corrected.

9. The inspection apparatus of claim 1, wherein the corrected image is the second master image having the pixel positions that are corrected using the correction parameter obtained from the memory, and the other one of the second master image or the currently read image that is not corrected is the currently read image.

10. An image forming system, comprising:
an image forming apparatus configured to output a plurality of printed images and cause an image reading device to subsequently read the plurality of printed images, image by image, into a plurality of read images; and
an inspection apparatus configured to inspect the plurality of read images using a correction parameter that is constantly updated as the plurality of read images are obtained, the inspection apparatus including,
a memory configured to store a correction parameter for a previously read image read from a previously printed image, the correction parameter being calculated to correct a positional shift in the previously read image with respect to a first master image generated from image data of the previously printed image; and
a processor configured to,
obtain a currently read image that is read from a currently printed image output from the image forming apparatus;
obtain image data of the currently printed image, which is used by the image forming apparatus to form the currently printed image;
generate a second master image based on the image data of the currently printed image;
correct pixel positions of one of the currently read image or the second master image using the correction parameter for the previously read image to generate a corrected image, the corrected image including a first reference point previously set;
extract a second reference point in the other one of the second master image or the currently read image that is not corrected, which corresponds to the first reference point set in the corrected image;
calculate a correction parameter for the currently read image, which is capable of correcting a positional shift in the currently read image with respect to the second master image, based on a difference between the first reference point and the second reference point;
inspect the currently read image based on a difference between the corrected image and the other one of the master image or the currently read image that is not corrected to generate an inspection result indicating whether the currently printed image sufficiently reproduces the image data of the currently printed image;
calculate an average correction value based on one or more of the correction parameter for the currently read image and correction parameters each obtained for each one of a number of previously read images; and
update the correction parameter for the previously read image that is stored in the memory, with the calculated average correction value, wherein the updated correction parameter is to be used for an image to be read subsequent to the currently read image.

11. The image forming system of claim 10, wherein the number of previously read images are respectively read from the a number of previously printed images that are subsequently output prior to outputting of the currently printed image.

12. A method of inspecting a plurality of read images each of which are subsequently read from a plurality of printed images output from an image forming apparatus, the method comprising:

storing in a memory a correction parameter for a previously read image read from a previously printed image, the correction parameter being calculated to correct a positional shift in the previously read image with respect to a first master image generated from image data of the previously printed image;

obtaining a currently read image that is read from a currently printed image output from the image forming apparatus;

obtaining image data of the currently printed image, which is used by the image forming apparatus to form the currently printed image;

generating a second master image based on the image data of the currently printed image;

correcting pixel positions of one of the currently read image or the second master image using the correction parameter for the previously read image to generate a corrected image, the corrected image including a first reference point previously set;

extracting a second reference point in the other one of the second master image or the currently read image that is not corrected, which corresponds to the first reference point set in the corrected image;

calculating a correction parameter for the currently read image, which is capable of correcting a positional shift in the currently read image with respect to the second master image, based on a difference between the first reference point and the second reference point;

inspecting the currently read image based on a difference between the corrected image and the other one of the master image or the currently read image that is not corrected to generate an inspection result indicating whether the currently printed image sufficiently reproduces the image data of the currently printed image;

calculating an average correction value based on one or more of the correction parameter for the currently read image and correction parameters each obtained for each one of a number of previously read images; and update the correction parameter for the previously read image that is stored in the memory, with the calculated average correction value, wherein the updated correction parameter is to be used for an image to be read subsequent to the currently read image.

13. The method of claim 12, wherein the number of previously read images are respectively read from the a number of previously printed images that are subsequently output prior to outputting of the currently printed image.

* * * * *